Dec. 11, 1928.

C. A. PARKER

HOSE CLAMP

Filed Sept. 2, 1927

Inventor
Charles A. Parker
By Herbert E. Smith
Attorney

Dec. 11, 1928.

C. A. PARKER 1,694,664

HOSE CLAMP

Filed Sept. 2, 1927

Inventor
Charles A. Parker
By Herbert E. Smith
Attorney

Patented Dec. 11, 1928.

1,694,664

UNITED STATES PATENT OFFICE.

CHARLES A. PARKER, OF HAUGAN, MONTANA, ASSIGNOR OF ONE-HALF TO WILLIAM H. LOGAN, OF ST. REGIS, MONTANA.

HOSE CLAMP.

Application filed September 2, 1927. Serial No. 217,066.

My present invention relates to improvements in hose clamps designed especially for use in connection with garden hose for the purpose of making water tight or sealed joints as between the hose and a nipple or sleeve.

The primary object of the invention is the provision of a hose clamp of the wrap around type which performs its function similar to a snubber or friction device, and means are provided for clamping or tightening the wrapped portion of the hose clamp in order that the joint may be effectively sealed and made water tight.

In carrying out my invention, I utilize sheet metal blanks which are stamped or pressed to shape and these blanks are fashioned to circular form in order that they may be wrapped around the hose, and their free ends connected for the purpose of clamping the device on the hose.

In the accompanying drawings, I have illustrated several forms in which my invention is embodied, such forms or modifications showing the best modes I have so far devised for the practical application of the principles of my invention.

Figure 4:
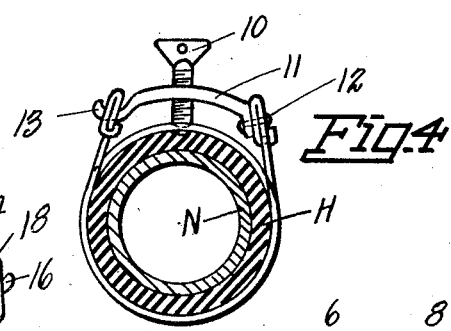
Fig. 4 is a sectional view through a hose joint showing the clamp plate with the clamp bolt passed therethrough, the plate being permanently attached to one end of the clamp and detachably connected to the other end.
Figure 5:
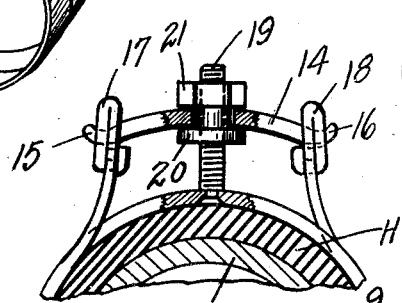
Fig. 5 shows a clamp plate detachably connected to both ends of the clamp, and using a stud bolt and nut for clamping.

In Figs. 4 and 5, in order that the general assembly and arrangement of parts may readily be understood, I have shown a nipple as N and a hose as H in section with the hose clamp secured in operative position.

Figure 1:
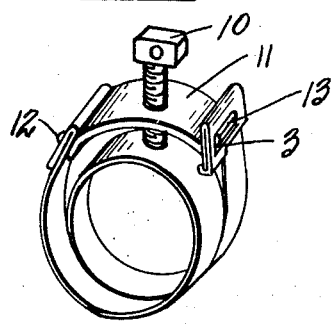
Figure 1 is a perspective view of a hose clamp using a clamp bolt threaded into a clamp plate, and showing the hose clamp in operative position.
Figure 3:
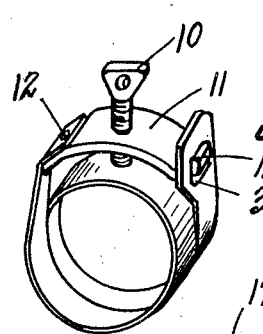
Fig. 3 is a perspective view showing a modified form of the device illustrated in Fig. 1.
Figure 6:
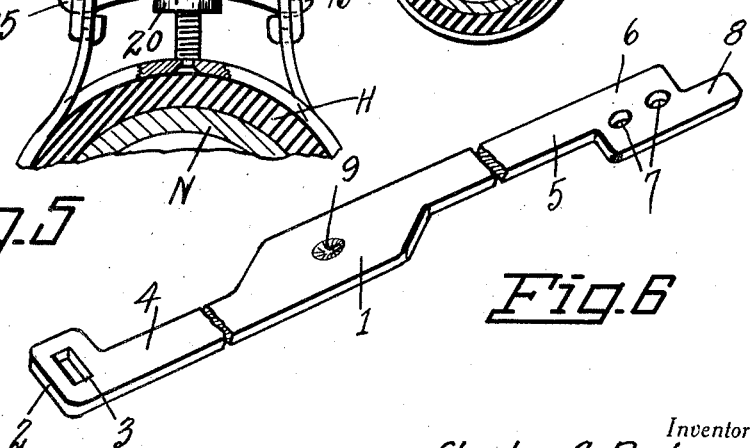
Fig. 6 is a perspective view of the metal blank before it is fashioned as the hose clamp.

In Fig. 6, the metal blank is shown as stamped or pressed from sheet metal and comprising a metal plate as 1 having at one end a head 2 and a transversely extending slot 3 therein. The plate is fashioned with two narrow portions 4 and 5 extending from the wide central portion 1 of the plate, and the narrow strip 5 which is about one-half the width of the plate, is fashioned with a head 6 that is adapted to be folded on a transverse line between the two rivet holes 7 in the head 6. The head 6 is adapted to be folded over to reinforce and strengthen the hose clamp, and a lug or foldable tongue 8 is provided on the head for a second fold around the head to further strengthen the folded head, as indicated in Figs. 4 and 5 which show the folded over heads and the lugs 8 inside of the respective ends of the hose clamp. The plate 1 is provided with a recess or depression 9 with which a bolt 10 is adapted to coact, and this bolt in Figs. 1, 3 and 4 is threaded through an arched clamp plate 11. This clamp plate, at one end, is riveted at 12 through the holes 7 as indicated in Figs. 1, 3 and 4, and this end of the clamp plate is rigidly secured to the head 6 of the clamp. A tongue 13 on the free end of the clamp plate is adapted to slip into the transverse slot 3 in the head 2 at the opposite end of the hose clamp as indicated in Figs. 1, 3 and 4. Thus it will be seen that the hose clamp is fashioned as a complete circle with its two ends joined by the clamp plate. One end of the clamp plate is permanently secured to one end of the hose clamp, and the other end of the clamp plate is detachably connected to the other end of the hose clamp. It will be apparent that by turning the bolt 10 in the clamp plate, the circle of the hose clamp is reduced in diameter, and the clamp is thus tightened on the hose as indicated in Fig. 4.

Figure 2:
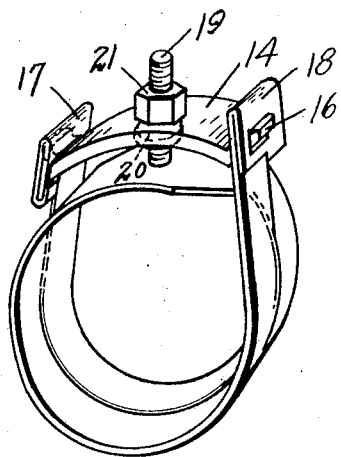
Fig. 2 is a perspective view of a hose clamp showing a stud bolt, clamp plate, and clamp nut on the bolt for tightening the hose clamp about the hose.

In Figs. 2 and 5, the clamp plate 14 has upturned ends 15 and 16, and these tongues engage in transverse slots in the heads 17 and 18 of the hose clamp. A stud bolt 19 is fixed to the body of the hose clamp, and a flanged nut 20 is threaded on the bolt and located in an opening in the clamp plate 14. A clamp nut 21 is also used on the stud bolt 19 above the clamp plate 14, and it will be apparent in Fig. 5 that by turning the nut 21 and the nut 19, that the diameter of the circle of the hose clamp is reduced to tightly grasp the hose.

Figure 7:
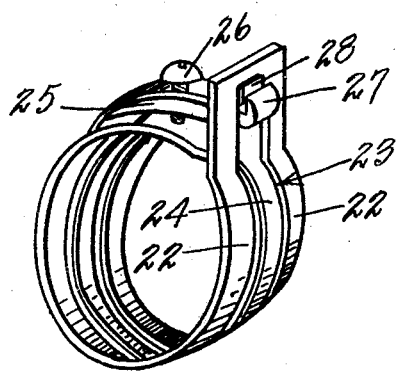
Fig. 7 is a perspective view of a hose clamp using a slot construction and a locking tongue for coaction therewith.
Figure 8:
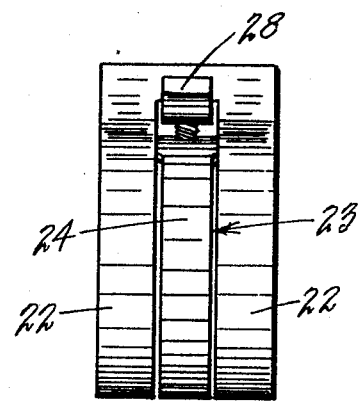
Fig. 8 is a side view of the clamp of Fig. 7.
Figure 9:
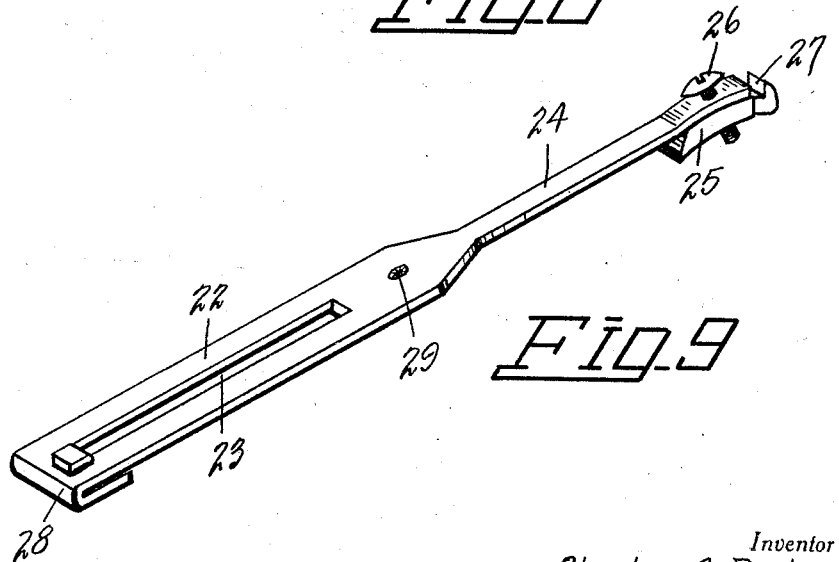
Fig. 9 is a perspective view of the blank before it is fashioned into the hose clamp of Fig. 7.

In the form of the device shown in Figs. 7, 8 and 9, I use a metallic plate 22 which has a longitudinal slot 23, and an extension 24 of this plate or band 22 is adapted to pass through the slot 23. Thus, the plate is formed as a circular band with the extension 24 passed through the longitudinal slot 23 and on the end of the extension 24 is secured a head 25 which is rigid with the end of the extension 24, and a screw 26 passes through the head and the end of the extension as shown in Figs. 7 and 9. The head 25 is fashioned with a hook 27, and the end of the plate 22 is folded over at 28 to reinforce this end of the plate and form a head in which the hook 27 engages as indicated in Fig. 7, to lock the ends of the band together. The plate 22 has a depression 29 in which the end of the bolt 26 fits, and it will be apparent that by turning the bolt or screw 26 the circular portion of the band will be reduced in diameter to clasp the hose clamp about the hose for the purpose of sealing the joint.

Having thus fully described my invention, what I claim as new and desire to secure by Letters Patent is—

1. The combination in a hose clamp fashioned as a circular band having a double turn and free ends, of a spaced clamp plate permanently secured to one end of the band, means for detachably securing the clamp plate to the other free end of the band, and a clamp secured in the clamp plate for reducing the diameter of the circular band.

2. The combination in a hose clamp fashioned as a circular band with a double turn and free ends, of a clamp plate permanently attached to one of said ends, a tongue on said plate engaging a slot in the other end, and a clamp screw threaded in said plate for reducing the diameter of the circular band.

In testimony whereof I affix my signature.

CHARLES A. PARKER.